United States Patent [19]

Skutecki

[11] Patent Number: 4,801,110
[45] Date of Patent: Jan. 31, 1989

[54] APPROACH TO HOVER CONTROL SYSTEM FOR HELICOPTERS

[75] Inventor: Edmund R. Skutecki, Glendale, Ariz.

[73] Assignee: Honeywell Inc., Minneapolis, Minn.

[21] Appl. No.: 135,907

[22] Filed: Dec. 21, 1987

[51] Int. Cl.[4] ............................................. B64C 13/16
[52] U.S. Cl. ................................. 244/17.13; 244/186
[58] Field of Search ................... 244/17.13, 183, 186, 244/187, 188; 364/428, 430, 433, 435

[56] References Cited

U.S. PATENT DOCUMENTS

| | | | |
|---|---|---|---|
| 2,830,291 | 4/1958 | Hecht et al. | 244/187 |
| 3,126,474 | 3/1964 | Zweibel et al. | 244/188 |
| 3,627,238 | 12/1971 | Menn | 244/188 |
| 3,665,465 | 5/1972 | Miller | 244/188 |
| 4,354,237 | 10/1982 | Lambregts et al. | 244/187 |
| 4,551,804 | 11/1985 | Clark et al. | 244/17.13 |
| 4,740,899 | 4/1988 | McElreath | 244/17.13 |

Primary Examiner—Galen Barefoot
Assistant Examiner—Rodney Corl
Attorney, Agent, or Firm—Arnold L. Albin

[57] ABSTRACT

An improved apparatus for automatic deceleration of a helicopter to substantially zero air speed from a glide slope descent. Parameters available in a typical helicopter automatic flight control system, such as vertical speed, glide slope error, longitudinal acceleration, and pitch attitude are blended together in a manner as to approximate helicopter ground speed which is then used in a control law computation to decelerate the helicopter to a near hover speed as the vehicle approaches a preset altitude minimum.

9 Claims, 3 Drawing Sheets

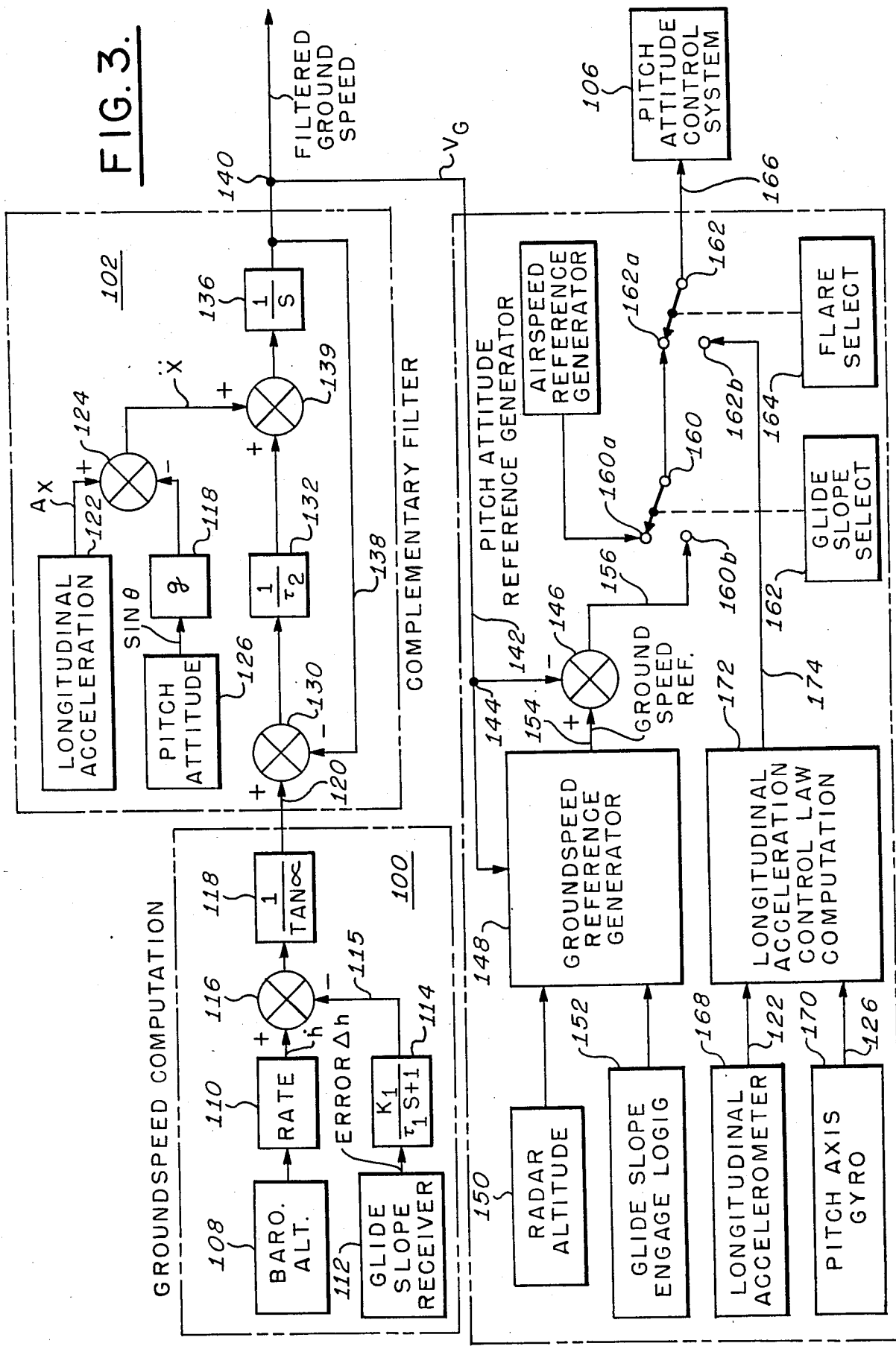

APPROACH TO HOVER CONTROL SYSTEM FOR HELICOPTERS

BACKGROUND OF THE INVENTION

1. Field of the Invention

The present invention relates generally to flight control systems for helicopters and more specifically to a system for controlling the approach of the helicopter to a hover condition at instrument landing system and microwave landing system facilities, without the requirement of sophisticated and expensive low airspeed sensors, Doppler radar, or precision position sensors.

2. Description of the Prior Art

In the area of fixed wing aircraft, low minimum approach fully automatic and semi-automatic control systems have been achieved by the prior art. However, systems of this type are generally too costly and occupy excessive space and weight to be practical for small and medium size helicopters. They are required to be fail-operational in nature, and the attendant redundancy requires extreme sophistication and expense. Moreover, such systems have been certified for low minimum altitude operation only at Category II and Category III ILS airport facilities. Such facilities exist at only a relatively few major airports Helicopters do not typically fly into such major facilities, but rather operate from smaller general aviation type airports. Thus, for a system to be practical in the helicopter market, it must be reasonably simple and economical as well as be operational at Catagory I ILS sites.

The key to successful low altitude approach maneuvers is the ability of the pilot to decelerate down to very low airspeeds at the terminal end of an approach. Flying at extremely low airspeeds (5-10 knots) results in a low descent rate, thereby providing the pilot with sufficient time to assess his situation and apply corrective measures if necessary i.e., continue the approach, take over with manual control, initiate a go-around maneuver, etc.

The key to low speed helicopter operation is the capability of measuring the aircraft speed down to substantially zero values. The accuracy of conventional pitot systems deteriorates rapidly at speeds below approximately 60 knots. This is due in part because of the helicopter rotor blade downwash effects which introduce undesirable inputs into the airspeed measuring system. Systems have been produced which employ mast mounted sensors which can measure low air speeds accurately, but these systems are susceptible to damage and again are too expensive for the commercial helicopter market. Doppler type radar based systems can also measure low speed accurately, but because of their cost and size, have proven to be practical only in military type helicopters.

Some previous systems have employed open loop deceleration techniques which rely on longitudinal accelerometer values only. These systems often compute a desired descent path and speed to a predetermined geographical location based on the initial measurements when entering the glide path. Such calculations of these descent paths will necessarilly require assumptions about the winds that will be encountered during the descent, since their exact nature is unknown. It may be seen, therefore, that winds differing significantly from the assumed values will cause the aircraft to deviate from the desired path and thereby result in either under or over flying the target geographical location. Further, these systems may result in terminal velocities which are unpredictable when operating under adverse wind conditions.

In U.S. Pat. No. 4,551,804, invented by T. R. Clark and C. D. Griffith, and assigned to the assignee of the present invention, a constant deceleration is commanded using a vertical gyro-referenced longitudinal accelerometer as the feedback sensor. The actual deceleration as a time function of the airspeed from the initial airspeed to a second airspeed is measured. Based on these measures, the total deceleration time to approach to a hover condition is predicted, after which the commanded deceleration is removed. However, this system is subject to inaccuracies, when operating under adverse wind conditions.

The present invention provides improved performance without requiring reliance on precision approach radar or distance measuring systems, and provides compensation for departures from the glide slope. Only conventional low-cost on-board sensors are used. The invention computes helicopter airspeed during the terminal end of an approach by making use of parameters already available in a typical helicopter automatic flight control system, such as vertical speed, glide slope error, and longitudinal acceleration. These parameters are blended together in such a manner as to provide a measure of helicopter ground speed, which is then used in a control law computation to decelerate the helicopter to a near hover speed as the vehicle approaches a predetermined altitude minimum. This results in a helicopter positioned at a fixed altitude (typically 50 feet) above the runway at a ground speed near zero. In this situation, the pilot can take over manually and land the aircraft or initiate a go-around maneuver if visibility conditions are too poor to land. Since the system is ground speed rather than acceleration or airspeed based, its accuracy is not dependent on wind conditions

SUMMARY OF THE INVENTION

The principles of the present invention are applied to achieve the foregoing objective in a helicopter having a pitch attitude control system including rotor cyclic pitch command means for controlling the pitch attitude and rotor collective pitch command means for controlling the vertical lift thereof, means for providing a signal representative of a vertical velocity of the aircraft, means for providing a velocity error signal representative of a vertical deviation of the flight path of the aircraft from a predetermined flight path, means for providing an algebraic difference of the vertical velocity signal and the velocity error signal, and function means proportional to a ratio of ground speed and vertical velocity, responsive to the subtracted signals, for deriving a signal proportional to ground speed.

The ground speed signal is followed by a complimentary filter for smoothing the ground speed computation, thereby making it less susceptible to inadvertant perturbations of a barometrically derived vertical speed signal, which can be caused by atmospheric disturbances. The filtered ground speed signal is combined with a ground speed reference signal which varies as a function of the craft's radar altitude, to provide a commanded fixed aircraft deceleration rate. The resulting ground speed error signal is applied to the pitch attitude control system of the craft for controlling the pitch attitude.

BRIEF DESCRIPTION OF THE DRAWINGS

FIG. 3 is a block diagram illustrating the preferred embodiment of the invention.

DESCRIPTION OF THE PREFERRED EMBODIMENT

Figure 1:
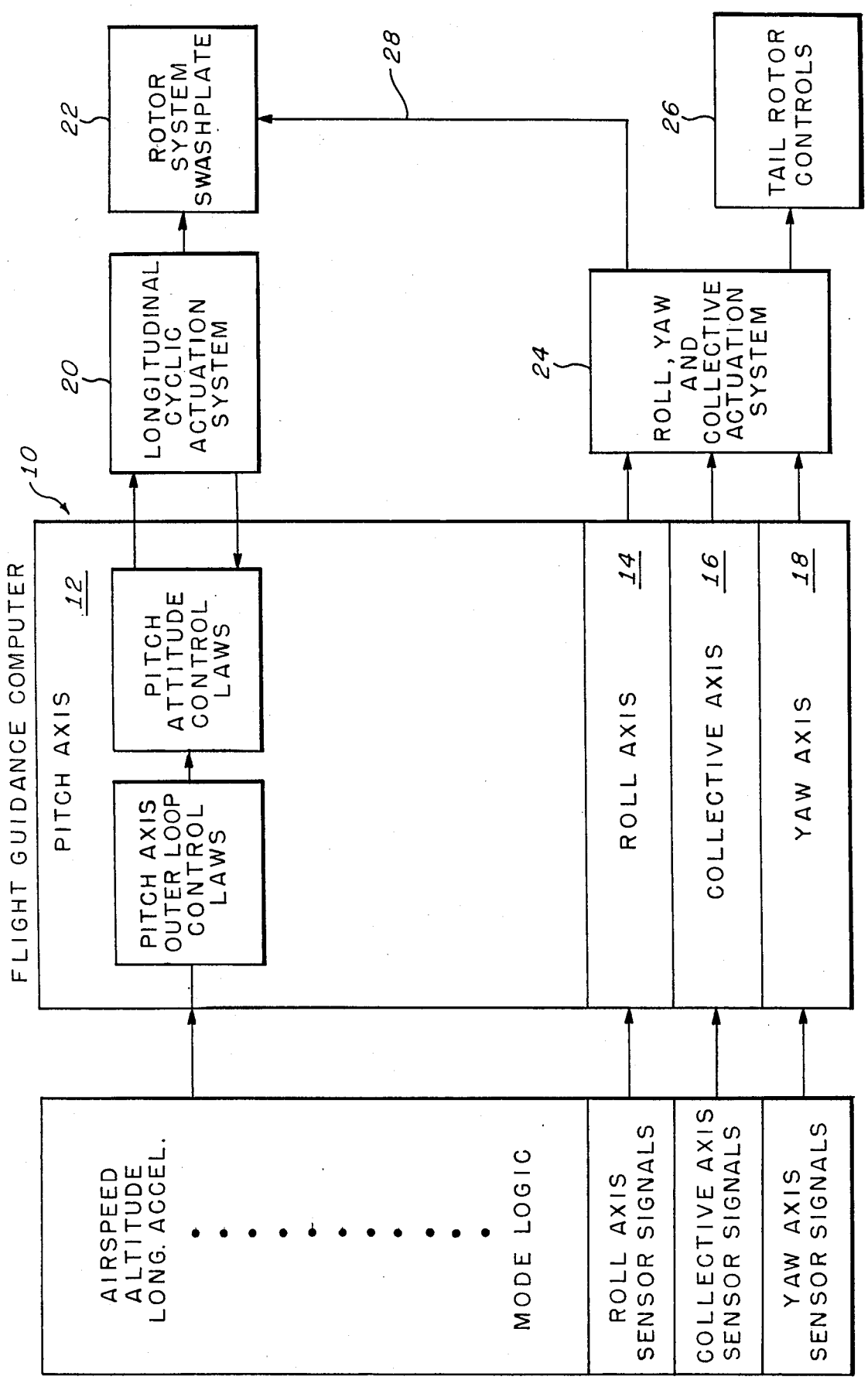
FIG. 1 is a block diagram depicting in schematic form a helicopter automatic flight control system.

Before proceeding to a description of the apparatus embodying the inventive concept, reference will be made to FIGS. 1 and 2 for the purpose of discussing the general operational features and requirements of the invention. A diagram of a typical helicopter automatic flight control system is shown in FIG. 1. A flight guidance computer 10 serves as the computational part of the system. It may include several axes of computation, including a pitch axis 12, roll axis 14, collective axis 6, and a yaw axis 18. The computer may be analog or digital in nature with most present day systems including both analog and digital technologies. Pitch and roll attitudes are controlled by means of the cyclic pitch control of the primary rotor system; yaw is controlled by an anti-torque tail rotor; and altitude is controlled by the collective pitch control of the primary rotor system. In addition, cyclic pitch also controls the fore and aft motion or airspeed of the helicopter and the lateral motion thereof.

The flight path of the helicopter is controlled in accordance with a plurality of signals derived from craft attitude and position references carried by the craft, these signals being combined and correlated as a function of the dynamic flight characteristics of the helicopter. Each axis 12, 14, 16, and 18 receives signals from respective sensors 30, 32, 34, and 36 for stabilizing the associated axis. Thus, roll stabilization of the aircraft may be achieved by providing a roll displacement control signal from a vertical gyro and a rate of change signal from a rate circuit. The resultant signal is supplied to suitable amplifiers and shaping networks and to the computer 14, the output of which energizes the roll actuation system 24. Stabilization about a selected altitude is obtained by providing a displacement signal corresponding to deviations from a preselected altitude which, together with a rate of change signal supplied by a suitable rate circuit, is applied to the collective axis actuation system. For stabilization about the yaw axis a gyromagnetic compass and heading selecter provides an output signal corresponding to deviations in the heading of the craft from a selected heading This signal, together with a signal proportional to the yaw rate and lateral acceleration of the aircraft are applied through suitable amplifiers to the yaw actuation system and tail rotor controls 26. The pitch axis portion 12 of the computer (which is primarily addressed by the present invention) takes input signals from various aircraft sensors 30 such as airspeed, altitude, and longitudinal acceleration and performs outer loop control law computations in block 42 which result in a pitch attitude reference 38. The outer loop refers to the function of controlling the path of the aircraft by introducing attitude and heading inputs to the autopilot. The pitch attitude reference signal 38 is applied to the pitch attitude control law system 40, which amplifies and shapes the reference signal and stabilizes the helicopter at a desired pitch attitude by positioning the longitudinal cyclic actuation system 20. The longitudinal cyclic actuation system is mechanically coupled to the helicopter rotor system swash plate 22.

The roll axis 14, collective axis 16, and yaw axis 18 sections of the system perform in a similar manner. Various input signals are combined in a manner such as to control the vehicle flight path as desired by controlling the various roll, yaw and collective actuators 24. The roll and collective actuators are mechanically coupled to the main rotor swash plate 22, while the yaw actuators are mechanically connected to the tail rotor pitch controls 26.

Land based civil aircraft rely on the instrument landing system (ILS), which is a low altitude approach system that does not provide guidance signals all the way to touchdown. The International Civil Aviation Organization (ICAO) has defined three categories for landing civil aircraft aided by ILS. Category I has a 200-ft ceiling and runway visual range of 2400 ft. The visibility must exceed 2400 ft. for the pilot to attempt a landing. Category II provides for a 100 ft. decision height and 1200 ft. runway visual range. Category III is subdivided into three ranges, from zero visibility to 700 ft. runway visual range.

Most commercially available helicopter systems are limited to instrument flight rules (IFR) operation above 200 ft. of radar altitude at Category I airport facilities. In part, this is due to the reaction time required for the pilot to apply corrective measures in the event a safe approach cannot be continued due to system malfunction, poor visibility, unexpected wind shear, etc. By reducing the speed of the helicopter to a very low value near the terminal end of the approach, the craft will approach the ground at a low descent rate, thereby increasing the time available to the pilot to assess his situation. This added available reaction time may allow reduction in certifiable visibility minimums.

Figure 2:
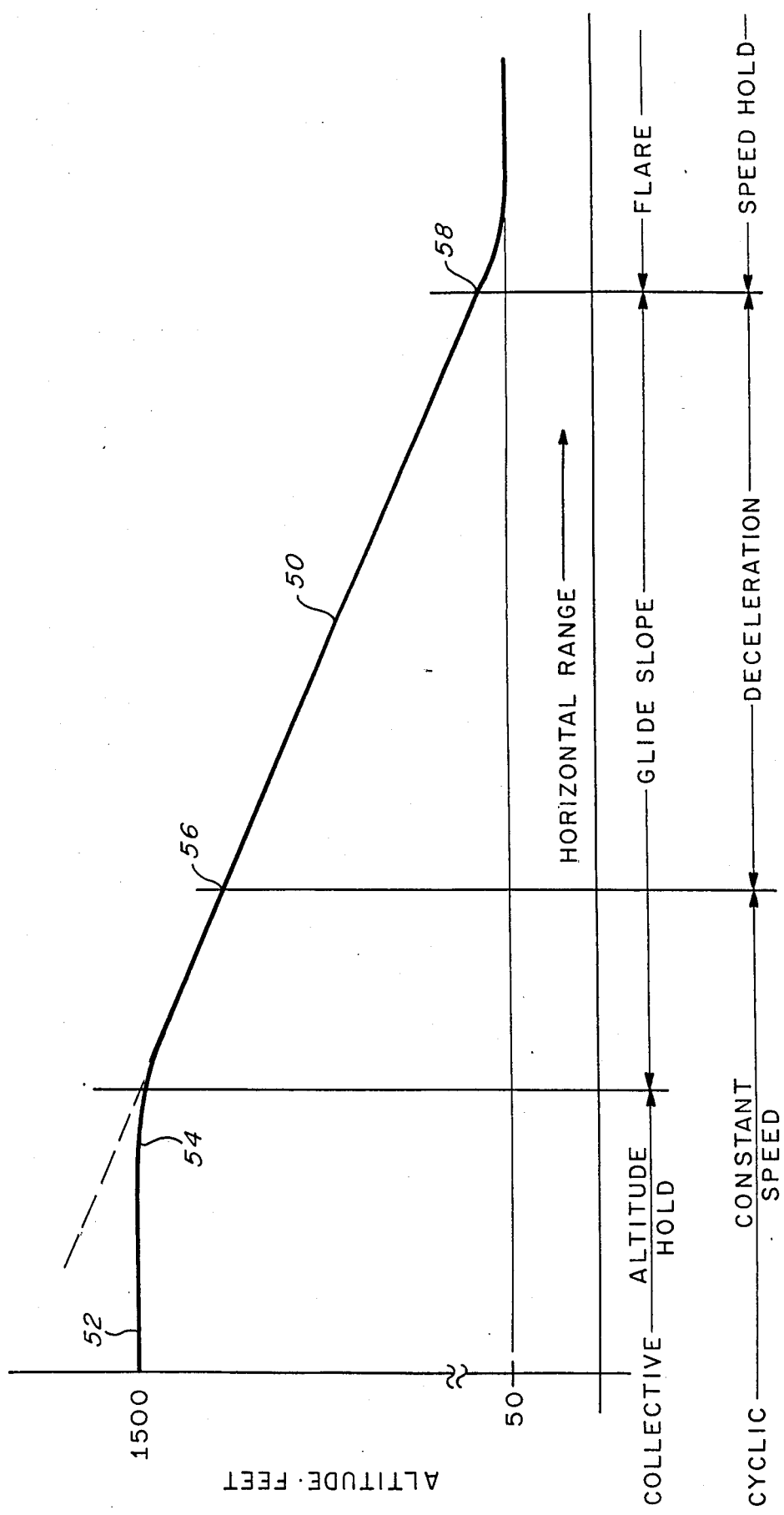
FIG. 2 depicts the glide slope on a graph of altitude versus range and illustrates the operational modes of the collective and cyclic pitch mechanisms at various ranges from the hover or landing terminal point.

As shown in FIG. 2, from approximately 1500 ft. to approximately 100 ft. above the runway, the approach is guided by a radio beam 50, defining a glide slope path. The elevation of the glide path is typically 2.75°. Deviations of more than a few tenths of a degree from this nominal value are unusual. Prior to encountering the glide slope beam, the vertical (collective pitch) axis of the craft may typically be operated in an altitude hold mode to fly at a constant altitude 52 while the longitudinal axis (cyclic pitch) of the craft is operated in a constant speed mode in accordance with a speed selected by the pilot. Typically, the helicopter approaches the transmitted glide slope beam at an angle and at an airspeed consistant with normal airport traffic and as directed by the ground controller (typically 90–150 kts). At point 54, a gradual descent is initiated which causes the aircraft to asymptotically capture the glide slope beam 50. Upon capturing the glide slope beam, the altitude hold mode is disabled in the vertical channel, which thereafter is controlled by a glide slope displacement signal. The constant speed control of the longitudinal axis is maintained until the craft reaches a predetermined range point 56 from the terminal point At point 56 a deceleration program commences which decelerates the aircraft to a very slow speed (5–10 kts). During the deceleration program, the longitudinal axis is controlled by an error signal indicative of the difference between a computed ground speed and a varying ground speed reference. At point 58 a flare maneuver is executed to level the aircraft at a predetermined altitude (typically 50 ft.) above the runway. A longitudinal axis reference signal is provided so as to keep the aircraft acceleration at a value near zero, thereby preserving the terminal velocity condition which exists at the time of flare mode initiation.

The invention is primarily directed at that portion of the approach where the deceleration occurs. As noted above, the beam angle $\alpha$ of a typical glide slope transmission is typically 2.75°. Therefore, a simple geometric relationship permits a reasonable prediction of vertical velocity as a function of ground speed;

$$\dot{h} = V_g \tan \alpha \tag{1}$$

where;
  h = vertical velocity.
  $V_g$ = ground speed.
  $\alpha$ = glide slope angle.

Minor changes in vertical velocity can be expected should the aircraft deviate from the predetermined glide path. These deviations can result in serious errors in the computed ground speed unless compensated. The variations, however, are predictible and are a function of the glide slope error $\alpha_e$, glide slope control law gain ($K_1$), and the dynamics of the collective axis vertical velocity closure, whose response may be represented by a lag network having a time constant $\tau_1$.

While glide slope error is conventionally measured in degrees of deviation from the center of the glide slope beam, it is readily converted to a linear measure by conventional trigonometric computation since the actual altitude is known from the radar altimeter and a slant range d may be computed from the known glide slope angle. Using the well known approximations for trigonometric functions of small angles, since the glide slope deviation is typically of the order of 0.5 degree or less, results in the following equation $$h = d \sin \alpha_e \tag{2}$$

Thus from equation (1)

$$\dot{h} = V_g \tan \alpha + K_1 \Delta h/(\tau_1 S + 1) \tag{3}$$

where $\Delta h$ is an altitude error proportional to glide slope error. Solving for ground speed, $$V_g = [\dot{h} - K_1 \Delta h/(\tau_1 S + 1)]/\tan \alpha \tag{4}$$

where $\tau_1$ may range between 0.75 to 2 sec, and typically has a value of 1 sec, and $K_1$ typically has a value of 0.2 feet/sec/ft.

The present invention may be implemented by using conventional analog circuitry and computational techniques or by using conventional wholly digital techniques or by using conventional hybrid digital/analog techniques. To simplify the understanding of the invention, it will be explained by using a generally analog format as shown in FIG. 3, it being understood that the same analog format may also represent, in block diagram form, the program of a programmable digital computer wherein the various analog inputs are converted to digital signals for digital processing and the various digital outputs are converted to analog signals for driving the control servo motors and the like.

FIG. 3 illustrates an embodiment of the present invention for generating a signal accurately proportional to ground speed and thus may it be employed as a data source for generating an error signal for driving the pitch attitude control system in the various operational modes of the flight path. The implementation is based on deriving redundant measures of the ground speed term; the computation of block 100 is based on air data; the computation of block 102 is based on inertial elements. The two measures are processed by frequency responsive networks in a manner to eliminate undesirable frequency characteristics and yet retain smoothness, accuracy, and excellent dynamic response. The mathematical development for the computation of filtered ground speed $V_g$ is summarized in the following relationship:

$$\dot{V}_g = \dot{x}/(\tau_2 S + 1) + x \tau_2/(\tau_2 S + 1) \tag{5}$$

In equation (5) $\dot{x}$ represents the ground speed computation of block 100 on line 120 derived from barometric altitude 108. $\tau_2$ is the time constant of a low pass filter having a transfer function $1/(\tau_2 S + 1)$, where S is the time differential operator d/dt. The time constant $\tau_2$ is of the order of 4 seconds which is long enough to filter out the anomalies of the air data static source. The term $\ddot{x}$ represents the longitudinal acceleration of the craft, corrected for gravitational errors in a manner to be described. The term $\tau_2/(\tau_2 S + 1)$ represents an electronic washout circuit wherein the time constant is chosen to be long enough to filter anomalies in the barometric altimeter output of the aircraft due to pitch rates, wind gusts, wind sheer, etc., but short enough as not to be affected by the long term effects of the erection characteristics of the vertical gyroscope used for deriving the pitch attitude signal.

Block 100 shows a circuit for deriving the ground speed computation of the present invention in accordance with equation (4). A signal representative of altitude is provided by barometric altimeter 108 and applied to rate generator 110 to derive a signal corresponding to the vertical velocity $\dot{h}$ of the aircraft. Conventional glide slope receiver 112 provides an error signal $\Delta h$ representative of the departure of the aircraft from the glide path. The error signal $\Delta h$ is applied to a high pass filter 114 having a time constant $\tau_1$ corresponding to the dynamic response of the collective axis vertical velocity closure. Filtered glide slope error is applied on line 115 to a summing junction 116 where it is subtracted from the vertical velocity factor $\dot{h}$. The output of summing junction 116 is then applied to function block 118, where it is multiplied by a trigonometric function corresponding to the inverse of tangent $\alpha$, the angle of the glide slope. The output of block 100 on line 120, therefore, represents the computed ground speed, corrected for departures from the glide slope path.

Referring now to block 102, the elements of a complementary filter are illustrated along with the derived inertial acceleration signal. A longitudinal accelerometer 168 strapped to the longitudinal axis x of the aircraft can be used to measure acceleration. The output of a linear accelerometer strapped to the x axis contains spurious signals because it is affected by the gravitational field of the earth. The accelerometer cannot differentiate between the equivalent acceleration of the earth's gravitational field g and the acceleration component $\ddot{x}$ of the aircraft. The effects can be compensated, however, because the value of g is accurately known, as is its direction. It is well known by those skilled in the art that the signal output of the accelerometer may be represented by the following equation:

$$A_x = \ddot{x} + g \sin \theta \tag{6}$$

where
- $A_x$ is the signal output of the longitudinal accelerometer
- $\ddot{x}$ is the longitudinal acceleration of the aircraft
- $g$ is the acceleration due to the earth's gravitational field
- $\theta$ is the angular disposition of the x axis of the aircraft with respect to ground.

Thus, the desired longitudinal acceleration component may be derived by subtracting the component due to the earth's gravitational field, which along the flight path is $g \sin \theta$. The signal output 122 of the longitudinal accelerometer 168 is applied to one input of a summing junction 124 A pitch axis gyro 170 provides a pitch attitude signal 126 which has a value of $\sin \theta$. The pitch attitude signal is applied to block 128, which has a gain factor of $g$ resulting in the term $g \sin \theta$. This signal is subtracted from the longitudinal acceleration signal $A_x$ at summing junction 124 to provide the resultant craft acceleration $\ddot{x}$. The term $\ddot{x}$ is based on the assumption that for small angles the value of the horizontal acceleration component is very nearly equal to the longitudinal acceleration component.

The computed ground speed signal 120 derived from barometric altitude is applied to summing junction 130. The output of summing junction 130 is multiplied by gain 132 which has a value of $1/\tau_2$. The gain scaled output thereof is applied to a further summing junction 134 where it is combined with the longitudinal acceleration $\ddot{x}$. The output of summing junction 134 is applied to an integrator 136 and the output thereof returned on line 138 inclosed-loop fashion where it is subtracted from the ground speed signal 120 at summing junction 130. The action of the filter loop may be represented by the following equation $$[(\ddot{x} - V_g)/\tau_2 + \ddot{x}]/S = V_g. \tag{7}$$

It may be seen that if the value for filtered ground speed $V_g$ derived in equation (5) is substituted in equation (7), then the magnitude of filtered ground speed will be seen to be equal to the magnitude of the barometrically derived ground speed.

Referring now to block 104 of FIG. 3, a glide slope control sequence involves interception of the glide slope beam at a safe altitude and airspeed, detection of the beam and capture when the aircraft has crossed the null of the beam, tracking of the aircraft on the glide slope beam, programmed deceleration of the aircraft to a lesser speed and, further deceleration to hover when the aircraft descends below a predetermined decision height.

An automatically sequenced glide slope mode would normally start with the flight guidance computer operating in the altitude hold mode. During this period, a reference airspeed error signal generated in a conventional manner in block 158 is applied through contact 160a of switch 160 and contact 162a of switch 162 on line 166 to the pitch attitude control system 106. The output of generator 158 represents airspeed error relative to the desired airspeed. The airspeed may be selected by the pilot or programmed externally during the approach and landing phase The error signal will drive the pitch attitude control servos until the desired airspeed has been achieved, in a conventional closed loop fashion Upon capturing the glide slope beam, ground speed reference generator 148 is engaged by glide slope engage logic 152 to provide a ground speed reference error signal in 154 accordance with a predetermined deceleration program. One such suitable program which provides both constant deceleration and variable deceleration as a function of time is shown in U.S. Pat. No. 3,916,688, issued Nov. 4, 1975 to J. C. Dendy, et al., and assigned to the assignee of the present invention The ground speed reference generator receives signals representative of radar altitude and the filtered ground speed and when enabled by the glide slope logic 152 produces a ground speed reference signal on line 154 which is applied to summing junction 146 and combined with signal $V_g$ from node 444. The output of summing junction 146 is applied on line 156 to switch 160. Within 5 to 10 seconds after glide slope capture, when the altitude of the craft is within a predetermined error with respect to the glide slope path, glide slope select logic 162 is enabled by the flight director computer and transfers the contact arm of switch 160 to contact 160b. This enables the signal of the ground speed error signal derived in summing Junction 146 to be transmitted through switches 161 and 162 to the pitch attitude control system 106. Since the actual flight path angle is now substantially equal to the glide path angle, the aircraft will be decelerated and descend on the glide slope inclination until a decision height is attained, determined in a conventional manner by the radar altitude sensor 150. Initiation of the flare path is sensed by determining the instant at which the aircraft's actual altitude as determined by the radar altimeter is less than the flare initiation altitude This is done by flare select block 164 which then causes switch 162 to switch the contact arm to contact 162b thereby switching the system from its glide slope command to the flare-out command. Longitudinal acceleration control law block 172 processes longitudinal acceleration from accelerometer 168 and pitch attitude from gyro 170 and is configured so as to keep the aircraft acceleration at a value near zero, thereby preserving the terminal velocity condition which exists at the time of flare mode initiation. The flare maneuver will bring the aircraft to a stabilized altitude (typically 50 ft.) above the runway.

From the foregoing, it will be appreciated that the present invention provides an improved low speed approach system in the following manner:

(1) Aircraft deceleration is controlled by a measure of ground speed which is independent of ground based distance measuring systems and reliable under adverse wind conditions.

(2) The ground speed computation is corrected for glide slope error where the aircraft deviates from the glide path.

(3) Only sensors and parameters available on typical helicopter automatic flight control systems are required.

While the invention has been described in its preferred embodiment, it is to be understood that the words which have been used are words of description rather than of limitation, and that changes or alterations may be made without departing from the true scope and spirit of the invention in its broader aspects.

Embodiments of the invention in which an exclusive property or right is claimed are defined as follows:

1. Apparatus for generating flight path control signals for an aircraft having a pitch attitude control system including rotor cyclic pitch command means for controlling the pitch attitude and rotor collective pitch command means for controlling the vertical lift thereof, means for providing a first signal representative of a vertical velocity of said aircraft with respect to a predetermined longitudinal flight path, means for providing a second signal representative of a velocity error corresponding to a difference in actual flight path from said predetermined flight path, means for combining said first and second signals to form a difference thereof, and function means proportional to an angular measure of said predetermined flight path, said angular measure relating vertical velocity to longitudinal velocity, said function means responsive to said difference signal, whereby to derive a longitudinal velocity signal corresponding to the vertical velocity of said aircraft with respect to said actual flight path.

2. The apparatus as set forth in claim 1, further comprising:

means for providing a signal representative of craft altitude, means responsive to said altitude signal and said longitudinal velocity signal for deriving a ground speed reference signal representative of a desired craft deceleration rate, means for providing an algebraic difference of said ground speed reference signal and said longitudinal velocity signal, to provide a ground speed error signal, and means for applying said ground speed error signal to said pitch attitude control system, whereby said aircraft is decelerated to a predetermined ground speed.

3. Apparatus as set forth in claim 2, further comprising:

means for providing an acceleration signal representative of a longitudinal acceleration of the aircraft, means for providing a signal representative of a pitch attitude of the aircraft, complementary filter means, responsive to said acceleration and pitch attitude signals, having an input coupled to receive said signal proportional to ground speed and an output for providing filtered ground speed to said means for deriving a ground speed reference signal.

4. The apparatus as set forth in claim 3 further comprising lag filter means, responsive to said path error signal and having a transfer function proportional to a quotient of a first predetermined constant relative to said path error signal and a second predetermined constant relative to an operational time constant of said means for controlling the vertical lift.

5. The apparatus as set forth in claim 4, said function means further comprising a product of said transfer function of said lag filter means and a trigonometric function of said second signal representative of a path error.

6. The apparatus as set forth in claim 5, said complementary filter means further comprising high pass filter means having a transfer function $\tau_2/(\tau_2 S+1)$ and a low pass filter means having a transfer function $1/(\tau_2 S+1)$, said factor $\tau_2$ comprising a predetermined time constant.

7. The apparatus as set forth in claim 6, further comprising longitudinal acceleration control means, responsive to said acceleration and pitch attitude signals, for generating a flare signal and defining a desired flare path of the aircraft terminating at a predetermined altitude and ground speed, and logic switch means for applying said flare signal to said pitch attitude control system and for decoupling said ground speed error signal from said pitch attitude control system, whereby said craft is brought to said predetermined ground speed and said predetermined altitude at said termination.

8. The apparatus as set forth in claim 7, said means for providing a path error signal comprising glide slope radio receiver means for providing said path error signal in the form of a linear velocity error in accordance with the vertical displacement of said aircraft from a radio defined flight path inclined at a predetermined angle relative to the horizontal.

9. Apparatus for controlling the flight of a helicopter along a descent path to a hover or landing termination point, comprising:

means for providing a signal representative of a desired air speed during the initial point of the descent at an altitude greater than a predetermined altitude from said termination point, means responsive to a function of altitude rate, glide slope error rate, longitudinal acceleration, and pitch attitude for providing a signal representative of the actual ground speed of the helicopter, means for providing a ground speed reference signal variable in accordance with altitude from an initial value at least equal to the maximum desired air speed at an altitude greater than said predetermined altitude to a final value representative of a predetermined lower ground speed, means for varying said reference signal from said initial to said final value as the helicopter proceeds along the descent path, commencing at said predetermined altitude from said termination point, means responsive to said actual ground speed signal and said variable reference signal for selectively providing an output indicative of craft attitude required to reduce the actual ground speed to said predetermined lower ground speed substantially at said termination point, means responsive to a predetermined function of acceleration and pitch attitude for selectively providing a further output indicative of craft attitude required to reduce the actual ground speed to a further predetermined ground speed in accordance with a predetermined flare path of descent substantially at said termination point, and means for selecting said output or said further output representative of engaging a desired descent path.

* * * * *